Oct. 30, 1962   J. KONAR   3,061,328
ADJUSTABLE STROLLER
Filed April 21, 1961   3 Sheets-Sheet 1
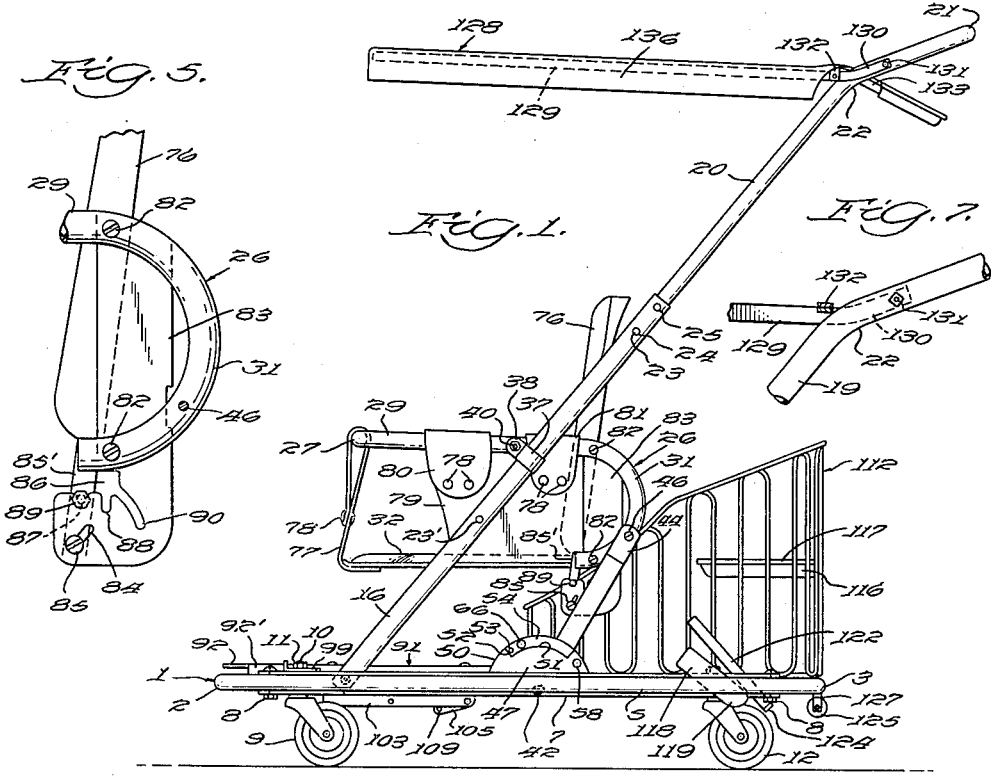
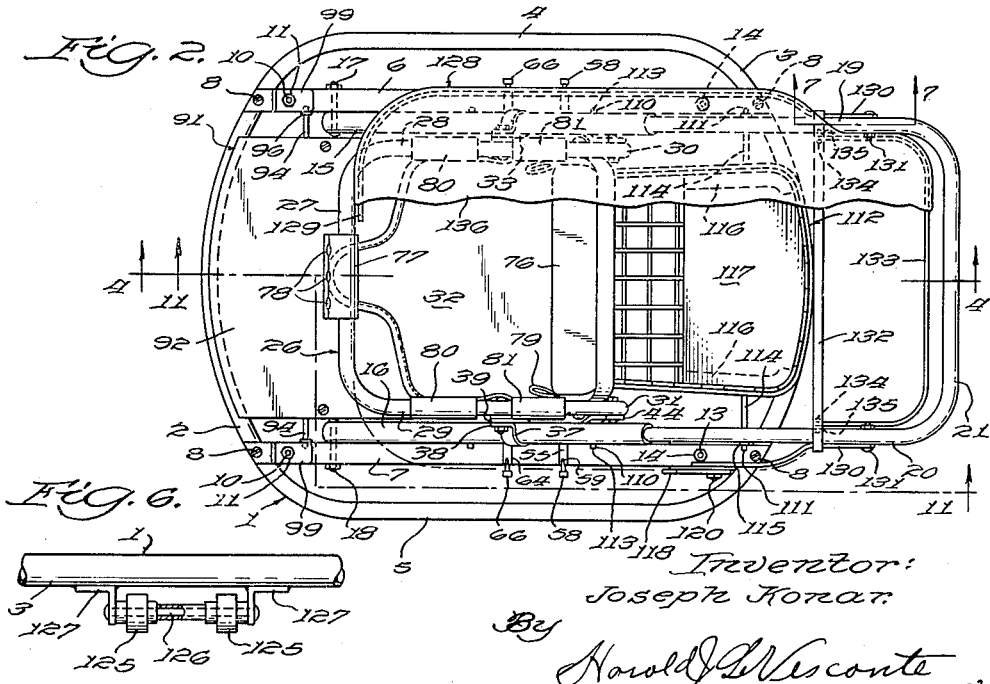
Inventor:
Joseph Konar
By
Harold J. LeVisconte
Atty.

Oct. 30, 1962 J. KONAR 3,061,328
ADJUSTABLE STROLLER
Filed April 21, 1961 3 Sheets-Sheet 2
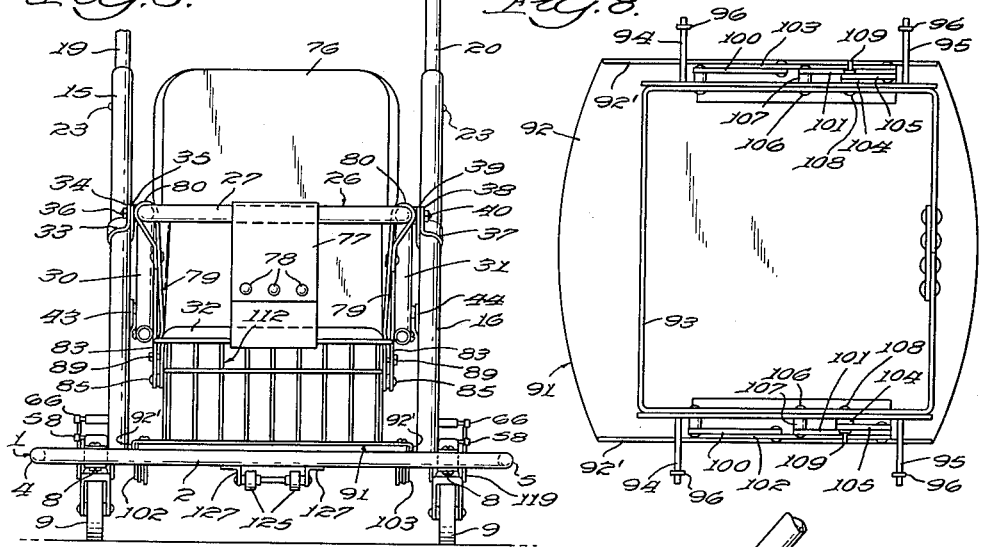
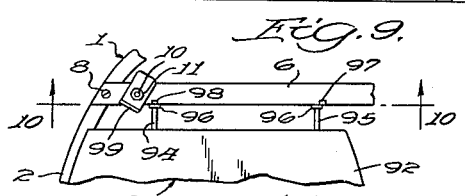
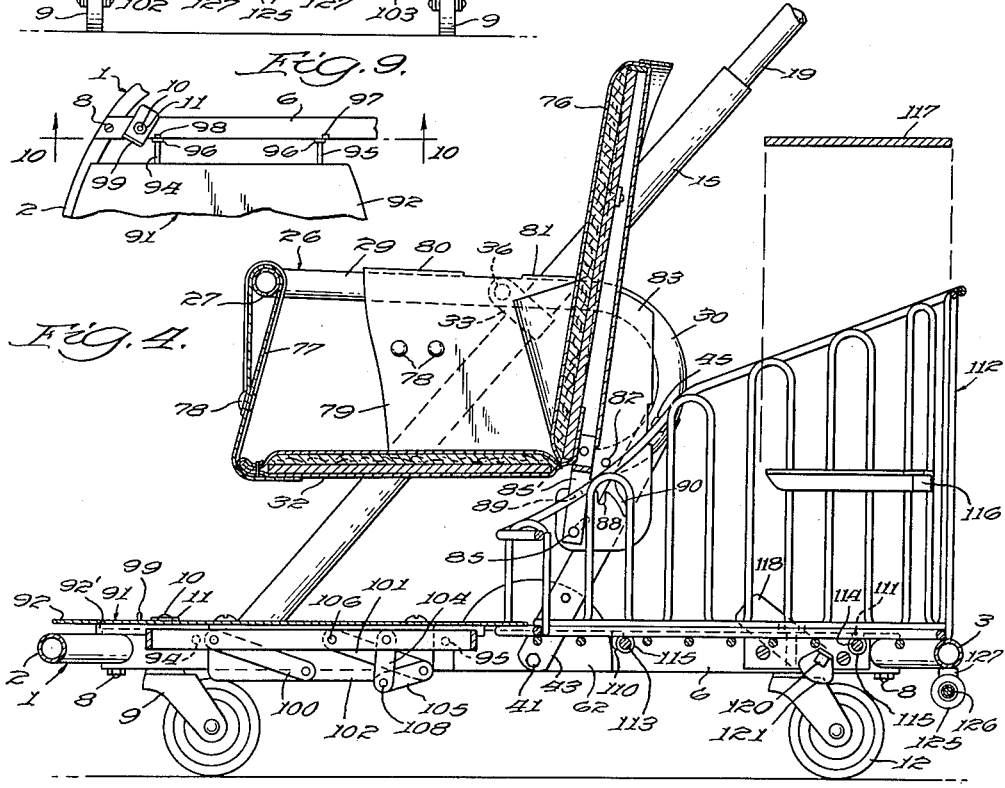
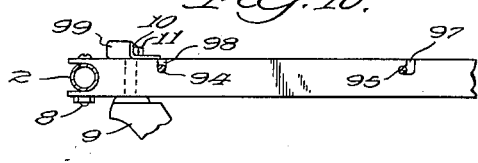
Inventor:
Joseph Konar.
By Harold J. DeVesconte
Atty.

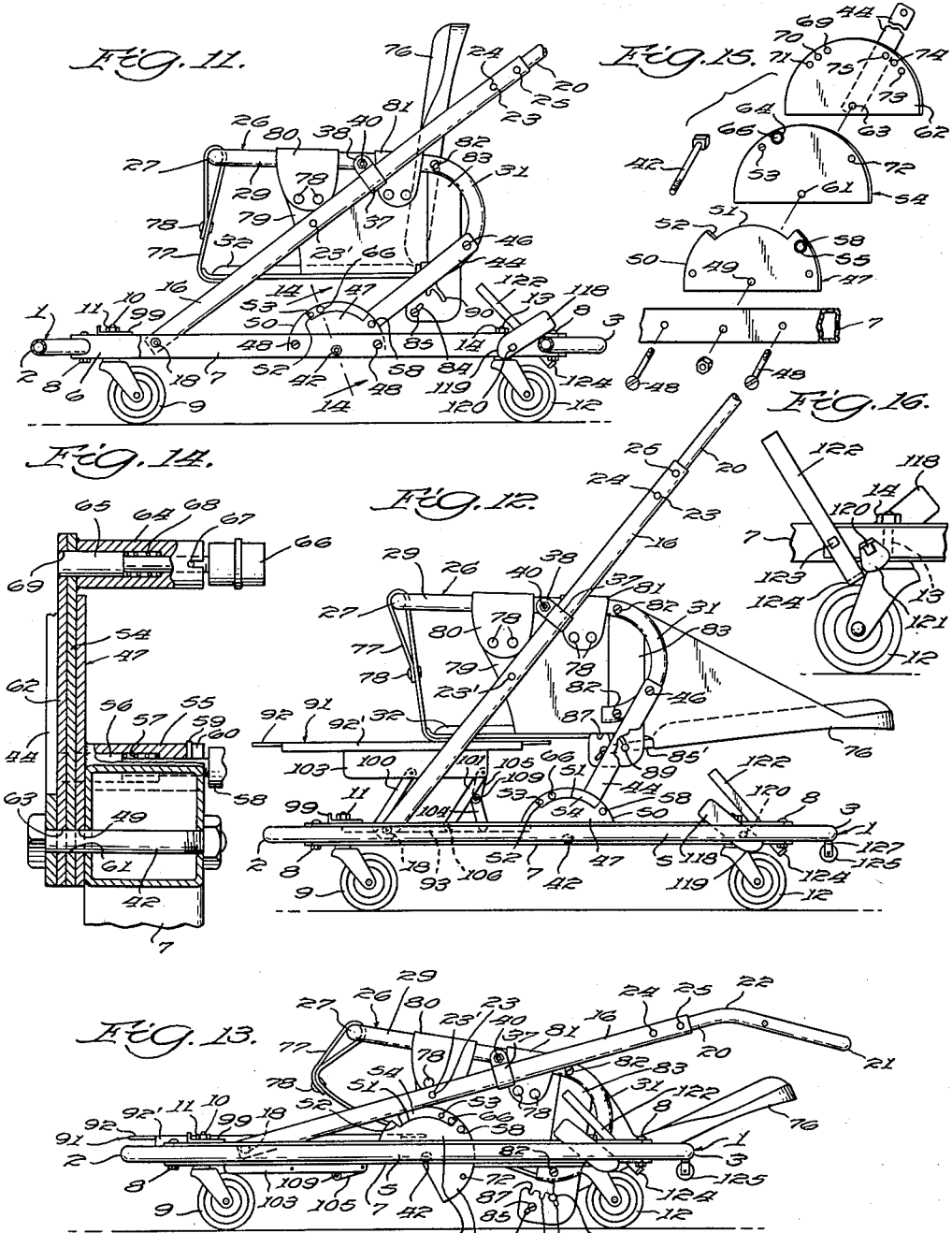

United States Patent Office 3,061,328
Patented Oct. 30, 1962

3,061,328
ADJUSTABLE STROLLER
Joseph Konar, 13563 Cantlay St., Van Nuys, Calif.
Filed Apr. 21, 1961, Ser. No. 104,553
21 Claims. (Cl. 280—36)

This invention relates to collapsible strollers and more particularly to an improved form thereof characterized by an increased range of utility.

The principal objects of the invention are: to provide a stroller including adjusting means for determining the limit to which it can be raised from its collapsed position; to provide means whereby it can be made into a bed; to provide a removable foot rest which, when installed on the stroller frame, is capable of elevation to serve as an extension of the seat in the formation of a bed; to provide a surrounding bumper bar; provide means for locking the rear casters against swinging movement; to provide a brake to prevent rolling of the stroller; to provide a seat structure which is readily removable and which is adjustable when installed; and to provide a detachable auxiliary rear seat structure which is readily removable and which is adjustable when installed; and to provide a detachable auxiliary rear seat structure commonly known as a "hitchhiker" which possesses the additional utility of being readily convertible into a package carrier.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevational view of a stroller embodying the present invention, the stroller being shown in erected position, FIG. 2 is a top plan view of the stroller shown in FIG. 1 with the canopy top thereof partially broken away, FIG. 3 is a front elevational view of the stroller as shown in FIG. 1, the upper portion of the handle means and the canopy being omitted, FIG. 4 is an enlarged scale sectional view taken on the line 4—4 of FIG. 2, of the seat component of the "hitchhiker" attachment being shown separately to illustrate the use of the attachment as a package carrier, FIG. 5 is a further enlarged scale, fragmentary, side elevational view of one of the seat back supporting and adjusting means, FIG. 6 is a fragmentary, rear elevational view, partly in section, of the curb engaging roller component, FIG. 7 is a fragmentary, detailed, side elevational view of one of the canopy supporting means, FIG. 8 is a bottom plan view of the foot rest component, FIG. 9 is a fragmentary, top plan view of the locking means for installing the foot rest component on the stroller, FIG. 10 is an enlarged scale, side elevational view taken on the line 10—10 of FIG. 9, FIG. 11 is a side elevational view of the stroller as arranged for use as a walker, a portion of the frame structure and handle means being broken away as indicated by the staggered line 11—11 of FIG. 2, FIG. 12 is a side elevational view of the stroller as arranged for use as a bed, FIG. 13 is a side elevational view of the stroller as collapsed for storage, FIG. 14 is a greatly enlarged, fragmentary, sectional view taken on the line 14—14 of FIG. 11 showing the height adjusting means, FIG. 15 is an exploded view of the height adjusting means shown in section in FIG. 14, and FIG. 16 is a fragmentary, side elevational view showing the rear caster lock and wheel brake means.

Referring to the drawings, the frame structure of the stroller comprises a length of metal tubing formed into a ring 1 of modified oval configuration having rounded front and rear ends 2 and 3 and straight, parallel right and left hand side portions 4 and 5. The frame structure further includes sidebars 6 and 7 disposed inwardly of and parallel to the side portions 4 and 5, respectively; said sidebars being preferably formed of rectangular metal tubing having the opposite ends thereof slotted to receive the end portions of the ring 1 adjacent the junctures of the ends 2 and 3 thereof with the sides 4 and 5. Bolts 8 extending through the upper and lower portions of the sidebars and through the portion of the ring embraced by said upper and lower portions serve to secure the sidebars to the ring component. The forward ends of the sidebars 6 and 7 each carry one of each of a pair of front casters 9 each of which is mounted for free swiveling movement on a mounting shank 10 extending through the side member and threaded on the distal end thereof to receive a nut 11 to clamp the shank to the sidebar. The rear ends of each of said sidebars each carry a freely swiveled rear caster 12 having a corresponding threaded shank 13 extending through the sidebar and secured thereon by a nut 14. The handle means comprises a pair of parallel tubular members 15 and 16 having their lower ends pivotally mounted at the front ends of the inner faces of the sidebars 6 and 7, respectively, by bolts 17 and 18; the opposite ends of said tubular members slidingly receiving, respectively, the shank ends 19 and 20 of a slightly smaller tube bent into modified U-configuration; the base of the U serving as the handle 21 and said shank portions 19 and 20 being bent as at 22 to bring the rear portions thereof into substantially horizontal position when the stroller is in erected position as best shown in FIG. 1. The distal ends of the shank portions 19 and 20 each carry an outwardly spring biased detent 23 engageable selectively with holes 23' in the members 15 and 16 to hold the handle component in collapsed position or with the holes 24 and 25 in said members to hold the handle in a selected extended position.

The seat component includes a length of metal tubing 26 bent at its midlength to form a horizontal transverse front bar portion 27 and horizontal, parallel, rearwardly extending armrest portions 28 and 29 at each end of said front bar portion, said armrest portions being disposed inwardly adjacent the handle members 15 and 16. The distal ends of said armrest portions thence extend downwardly and forwardly in return bends 30 and 31 and terminate in rear of and in the general horizontal plane of the seat board and cushion 32 to which more detailed reference will hereinafter be made. The handle member 15 carries a metal strap 33 surrounding it and terminating in parallel forwardly projecting ends 34 and 35 which are tangential to the member 15 at the side thereof adjacent to the armrest portion 28 and a horizontal bolt 36 extending through said strap ends and through the armrest portion 28 adjacent the rear end thereof affords pivotal connection between the armrest portion 28 and the member 15. A corresponding strap 37 similarly surrounds the member 16 and is provided with ends 38 and 39 in mirror image relation to the ends 34 and 35 of the strap 33 and said ends 38 and 39 are pivotally connected to the armrest portion 29 by a bolt 40 disposed in the axial line of the bolt 36. The sidebars 6 and 7 at a point approximately midway of their length carry, respectively, horizontal transverse bolts 41 and 42 disposed in the same axial line and which at the inner faces of said sidebars serve as a pivotal mounting means for the lower ends of links 43 and 44, respectively. The upper ends of said links are pivotally connected, respectively, by bolts 45 and 46 to the outer sides of the curved portions 30 and 31 at axially aligned points which are slightly rearwardly of the distal ends of said curved portions. As will be presently explained, the portions of the handles 15 and 16 extending between the side bars and the seat structure and the links 43 and 44 provide a modified parallel rule mechanism for erecting and folding the seat structure on the frame structure.

The means for latching the erected stroller at a selected one of a plurality of elevations and for unlatching it to permit the folding or collapse thereof is associated with the pivotal mounting of the links 43 and 44 on the sidebars 6 and 7 and since they are mirror images of each other a description of the one shown in detail in FIGS. 14 and 15 will serve for both. This adjusting and latching means comprises a first semicircular metal plate 47 fixed to the inner face of the sidebar 7 by screws 48, 48 and having a hole 49 through which the bolt 42 extends; said plate being bounded by a straight edge parallel to the lower edge of the sidebar 7 and a curved or circular edge 50 generated about the axial line of the hole 49, said circular edge being interrupted intermediate its length by a segmental notch 51 of which the front end face 52 serves as a stop which when engaged by the head of a screw 53 carried by the second plate 54 limits the extent of opening or erecting movement of the stroller as shown in FIG. 1. The outer face of the plate 47 immediately rearwardly of the notch end face 52 is provided with a laterally extending sleeve 55 having a stepped diameter axial bore extending therethrough with the larger portion of the bore at the end of said sleeve adjacent to plate 47. Mounted for reciprocation in said bore is a stepped diameter latch bolt 56 normally urged toward the plate 54 by a compression spring 57 surrounding the smaller diameter of the latch bolt and reacting between the opposed shoulders of the bore and bolt and, beyond the outer end of the sleeve 55, the bolt is provided with a hand knob 58 by which it may be pulled out of engagement with certain holes in the associated plates as will be presently more particularly described. Means may also be provided for retaining the bolt in withdrawn position as, for example, a radially extending pin 59 normally engaging a mating slot 60 in the outer end of the sleeve whereby upon withdrawal of the bolt with the pin 59 moved clear of the end of the sleeve and rotating the bolt sufficiently to move the pin out of the slot 60, the bolt will be retained in retracted position.

The plate 54 is of the same semicircular contour as the plate 47, the curved edge thereof, however, being continuous. It is provided with a hole 61 through which the bolt 42 extends. At the side of the plate 54 opposite the plate 47 the bolt 42 also carries a third semicircular plate 62 having a hole 63 through which the bolt 42 extends; said plate being interposed between the facing sides of the link 44 and the plate 54 and being fixedly secured to said link. The outer face of the plate 54 carries a laterally outwardly projecting sleeve 64 movable along the notch 51 in the plate 47 as the plate 44 is moved on the bolt 42 incident to erecting and collapsing the stroller as will be presently described. Mounted for reciprocation in the sleeve 64 is a second latch bolt 65 which carries a hand knob 66 and a locking retaining pin 67; said second latch bolt being normally urged toward the plate 62 by a compression spring 68 disposed within the sleeve 64. The bolt 65 is selectively engageable with a series of holes 69, 70 and 71 with resultant locking of the plates 54 and 62 together for movement in unison on the bolt 42 in different angular relation to each other. This also changes the angular position between the link 44 and the radial line of the plate 54 containing the latch bolt 65. The plate 64 has a hole 72 therethrough which is engaged by the inner end of the latch bolt 56 and the plate 62 is provided with a series of holes 73, 74 and 75 adapted to be placed in registry with the hole 72 as the holes 69, 70 and 71 are engaged by the latch bolt 65. Thus, when the latch bolts 56, 56 are retracted, the handle members 15 and 16 and the links 43 and 44 swing in a clockwise direction as viewed in FIGS. 1, 4, 11 and 12 to the position shown in FIG. 13 in which the handle members 15 and 16 rest on the curved edges of the plates 54 and 62. When the handle is lifted, the bolts 56, 56 will enter the hole 72 in the plates 54 and the ones of the holes 73, 74 or 75 placed in alignment therewith by the adjustment effected by the latch bolts 65. Obviously, if the bolt 65 is engaging the hole 69, the seat will be at a higher elevation when the stroller is opened or erected for use than if the said pin engages either the holes 71 or 72. The purpose of this adjustment is to accommodate larger or smaller children as, for example, the growth of the child for which it is being used. It will be observed that the links 43 and 44 and the handle portions 15 and 16 afford a modified parallel rule type of mechanism for erecting and folding the seat structure.

The seat structure in addition to the seat board and cushion includes a back board and cushion 76; both boards and cushions being covered by a suitable flexible plastic cover and the flexible cover additionally forming a hinging joint between said boards to permit the adjustment of the back relative to the seat as will be presently described. The said fabric cover also includes a front strap portion 77 which extends forwardly between the legs of the infant and thence around the bar 27 where it is detachably secured by snap fasteners 78. The seat also includes side flap portions 79, 79 having front and rear tabs 80 and 81 which extend around the armrest portions 28 and 29 at either side of the connections of said armrest portions to the handle members; said tabs being likewise detachably secured by other snap fasteners 78 and said side flaps having sufficient fullness to permit the back portion to be positioned approximately in a horizontal position as shown in FIG. 12.

Fixed by bolts 82, 82 to the curved end portions 30 and 31 of the armrest members are one each of a pair of back supporting plates 83, 83 best shown in FIG. 5; said plates at their forward lower end having a forwardly and downwardly extending slot 84 each of which is engaged by one each of a pair of studs 85, 85 carried by and projecting outwardly laterally from brackets 85', 85' depending from the seat back board 76. The plates 83, 83 each have the front edge thereof recessed at 86 to afford openings for front and rear vertical slots 87 and 88 selectively engageable by one each of a second pair of studs 89, 89 carried by the brackets 85', 85' above the studs 85, 85 and extending parallel to said studs. The recess 86 also affords an opening for a rearwardly and downwardly curved slot 90 adapted also to be selectively engaged by the studs 89, 89. The slots 84 are at all times engaged by the studs 85 and depending on which of the slots 87 or 88 are engaged by the studs 89, 89 the back is in substantially vertical or somewhat reclined position. If the curved slots 90 are engaged by the slots 89 the back is in substantially horizontal position as shown in FIG. 12. It will be noted that it is only necessary to lift the back sufficient to bring the studs 89 out of the slot which they happen to occupy and then to swing the back to engage the slot desired to be engaged and it will remain there until again moved.

The footrest component generally indicated by 91 comprises a platform 92 formed of a flat sheet of metal of slightly less with than the distance between the sidebars 6 and 7 and having straight parallel sides and forward and rear ends which are rounded at about the same curvature as the front end 2 of the tubular element 1, the side edges 92', 92' of said sheet being bent downwardly and the sheet when employed as a footrest extending longitudinally from a point directly above said front end portion 2 to a point adjacent a vertical line containing the axial line of the bolts 41 and 42. The platform 92 is carried by a framework and elevating means which is detacahbly mounted on the sidebars 6 and 7 and which comprises a base member 93 formed of a strip of material bent to form a hollow rectangle and having a forward pair of studs 94, 94 projecting from opposite sides thereof and a corresponding rear pair of studs 95, 95 disposed in parallelism with the studs 94, 94; each of said studs having a peripheral rib 96 disposed slightly inwardly from the outer end thereof and the distance between said ribs on each pair of studs being slightly less than the distance between the adjacent side faces of the sidebars 6 and 7. The sidebars each have a notch 97 on the inner face thereof adapted to receive the distal ends of the studs 95, 95; said notches at their lower ends extending forwardly for a distance approximately equal to the diameter of the studs. The sidebars 6 and 7 adjacent their forward end are each provided with a downwardly extending notch 98 on the inner side face thereof adapted to receive the distal ends of the studs 94, 94 when the studs 95, 95 are seated in the forwardly extending portions of the notches 97, 97. By this means the studs 95, 95 are prevented from escape from the notches 97, 97 and sheet metal leaves 99, 99 swingable about the front caster studs 10 and held thereon by the nuts 11 are movable over or away from the notches 98, 98 to retain the studs 94, 94 therein or to permit them to be removed. The ribs 96 on the studs hold the frame structure against lateral movement by engagement with the side faces of the sidebars 6 and 7.

The platform is secured to the frame 93 for relative vertical movement by front and rear pairs of parallel rule links 100 and 101 each of which has one end pivotally mounted on the side of the frame 93 for movement about a horizontal axis and has the other end thereof pivotally connected to the inner faces of flanges 102 or 103 at opposite sides of the platform; said flanges being disposed outwardly of the sides of the frame 93 to afford clearance for said links and extending below the bottom plane of the frame member when the platform is resting on said frame member. The means for locking the platform in elevated position comprises right and left hand pairs of toggle links, each pair comprising a link 104 having one end pivotally connected to the frame member 93 slightly rearwardly of the pivotal connection of the link 101 to said side and the other end thereof pivotally connected to one end of the link 105 having its other end pivotally connected to the same pivot point on the platform flange as the link 101. The pivot pin 106 which connects the link 101 to the frame 93 includes a collar 107 which spaces the link 101 outwardly therefrom to afford clearance for the toggle links 104 and 105 and the pivot pin 108 which interconnects the ends of the links 104 and 105 has a lateral extension 109 which engages the rear edge face of the link 101 when the platform is elevated as in FIG. 12 with the toggle links being moved to an overcenter position, thus serving to hold the platform in said elevated position. As the platform is lifted from the frame 93, the line 105 causes the link 104 to swing in a counterclockwise direction as viewed in FIGS. 4 and 12 until the links are substantially vertical. The connection between the links is then pressed toward the link 101 to carry the toggle overcenter whereupon any downward pressure on the platform is resisted by the tendency of the toggle to collapse being opposed by the engagement of the pivot pin extension 109 with the link 101. When it is desired to lower the platform, the toggles are moved back overcenter in the opposite direction, whereupon, the platform can be moved down against the frame 93. When the platform is elevated, and the back is dropped to its substantially horizontal position as shown in FIG. 12, the stroller is arranged to serve as a bed for the occupant. When the platform is removed from the stroller the infant may use the stroller as a walker.

The inner faces of the side bars 6 and 7 immediately rearwardly of the plates 47 are provided with downwardly and thence rearwardly extending L-shaped slots 110 which are similar to the slots 97 and adjacent their rear ends the sidebars are provided with vertical slots 111 which are similar to the slots 98. These slots serve as mounting means for an optionally usable attachment comprising a wire network basket 112 having laterally extending pins 113 engageable with the slots 110 and other pins 114 engageable with the slots 111; said pins like the pins 94 and 95 of the platform, having peripheral ribs 115 inwardly from the distal ends thereof which engage the side faces of the sidebars 6 and 7. This basketlike structure on each side thereof is provided with opposed horizontal ledge members 116 disposed at a distance above the bottom of the basket structure to define a seat and a seatboard 117 is detachably mounted on these ledge members. With the seatboard in place, the basket attachment serves as a seat for a second child and such an attachment is commonly known as a "hitchhiker." With the seatboard removed from the ledges, the basket attachment serves as a shopping cart basket or the like.

It is particularly to be noted that the distance between the slots 110 and 111 is the same as the distance between the slots 97 and 98. Thus, when the stroller is to be employed as a walker, the footrest can be stored by mounting it in the slots 110 and 111 in place of the basket attachment.

Means is provided for optional release of the rear casters for free swiveling movement as when the stroller is to be used as a walker, or for locking said rear casters against such movement when the stroller is to be used as a vehicle. This means comprises a pair of lever elements 118, 118 pivoted one each on the rear ends of the sidebars 6 and 7 and each having a cam end 119 engageable with a side of the caster frame. At the opposite side of the sidebar the pivot bolts 120, 120 to which said lever elements are rigidly secured each carry a second cam element 121 engageable with the opposite side of the caster frame to cooperate with the cam end 119 to hold the caster frame against swiveling movement when the lever is moved with the handle portion thereof extending diagonally upwardly and forwardly. When the lever is moved counterclockwise as viewed in FIG. 16, to extend diagonally upwardly and rearwardly, as viewed in said figure, these cam portions 119 and 121 are disengaged from the caster frame allowing it to swivel freely. The rear end of the sidebar 6 is further provided with a brake lever 122 pivoted thereto at 123 said lever having a shoe portion 124 extending beneath the sidebar closely in rear of the caster wheel and being movable against the caster wheel, which is formed of a compressible rubber or like composition, to a slightly overcenter position and thus hold the wheel against turning. This action is posible, of course, only when the caster wheel is locked against swiveling action. Means is also provided to facilitate the movement of the stroller up and down a curb comprising a pair of rollers 125, 125 mounted for free rotation on an axle 126 carried by spaced brackets 127, 127 depending from the rear end 3 of the tubular element 1.

A sunshade or canopy 128 is also provided; said canopy comprising a generally rectangular main frame 129 formed from a metal strip having rearwardly extending end portions 130, 130 attached to the upper portion of the handle members 19 and 20 by bolts 131, 131 and having a crossbar 132 which rests on the upper surface of the said handle members adjacent the bends 22 therein, said canopy frame further having a smaller rear frame member 133 pivotally connected by bolts 134, 134 to ears 135, 135 depending from the underside of the crossbar 132; said canopy frames supporting a suitable sheet plastic or other fabric material cover 136.

Thus, there has been provided an improved stroller construction in which the seat means is vertically adjustable to selected elevations which has a removable and readily adjustable footrest enabling the stroller to be used as a walker and also as a bed; in which the stroller includes a surrounding bumper bar to eliminate corners which might get caught or which might mar articles of furniture when the stroller is being used as a walker and which has a detachable auxiliary rear seat which is alternatively usable as a basket. While in the foregoing specification there has been disclosed a presently preferred embodiment of the invention, such disclosure has been by way of example only, wherefore, it will be understood that the invention is not to be deemed to be limited to the precise details of construction thus disclosed and that the invention includes as well all such changes and modifications in the parts, and in the construction, combination and arrangement of parts as shall come within the purview of the appended claims.

I claim:

1. In a folding, stroller type vehicle, a frame structure including a pair of horizontal, longitudinally extending side bars and means rigidly connecting said side bars at the front and rear ends thereof in laterally spaced, parallel relation, a set of casters mounted one each at each end of each of said side bars, a handle means including a transversely extending grip portion and parallel side members having the distal ends thereof pivotally connected to said side bars adjacent the forward ends of said side bars, a seat structure movable on said frame structure between a folded position resting on said frame structure and an erected position, said seat structure including a seat and a pair of arm rest components each terminating in a downwardly extending distal end, and mounting means for said seat structure comprising means pivotally connecting the arm rest components of said seat structure to each of said handle members adjacent to the said distal ends of said arm rest components, and a pair of rigid links each having one end thereof pivotally attached to one each of said side bars adjacent to the midlength of said side bars and having the opposite end thereof pivotally attached to the lower rear portion of said seat structure; said links and said portions of said handle means attached to said seat structure and said side bars constituting a modified parallel rule mechanism for erecting and folding said seat structure.

2. A stroller as claimed in claim 1 in which said means rigidly connecting the rear ends of said side bars carries curved engaging roller means operable to facilitate the movement of the stroller up and down a curb.

3. A stroller as claimed in claim 1 in which said means for connecting said side bars also includes portions disposed outwardly of and generally parallel to said side bars.

4. A stroller as claimed in claim 1 in which said means for mounting said seat structure on said frame structure includes manually releasable, spring biased lock means operable to lock said mounting means in seat erected position.

5. A stroller as claimed in claim 1 in which said mounting means for said seat structure includes means for selectively determining the extent of elevation of said erected position of said seat structure.

6. A stroller as claimed in claim 1 in which all of said pivotal connections for said mounting means are arranged for movement about parallel, horizontal axes extending transversely of said stroller.

7. A stroller as claimed in claim 1 in which said side bars forwardly of said seat structure and rearwardly of the means connecting the forward ends of said side bars carry a footrest member detachably removable therefrom to permit use of the vehicle as a walker.

8. A stroller as claimed in claim 1 in which said side bars rearwardly of said seat structure are provided with socket means for detachable mounting thereon of a second seat means.

9. A stroller as claimed in claim 7 in which said side bars carry means for detachably mounting said foot rest on said side bars either forwardly of said seat structure or in rear thereof.

10. A stroller as claimed in claim 7 in which said foot rest includes elevating means for raising the surface thereof substantially through the plane of said seat.

11. In a folding, stroller type vehicle, a frame structure including a pair of horizontal, longitudinally extending side bars and means rigidly connecting said side bars in laterally spaced, parallel relation, a set of casters mounted one each at each end of each of said side bars, a handle means including a transversely extending grip portion and parallel side members having the distal ends thereof pivotally connected to said side bars, a seat structure movable on said frame structure between a folded position resting on said frame structure and an erected position, said seat structure including a seat and a pair of arm rest components connected at their forward ends and each terminating in a downwardly extending distal end, and mounting means for said seat structure comprising means pivotally connecting the arm rest components of said seat structure to each of said handle end members adjacent to the said distal ends of said arm rest components, a pair of rigid links each having one end thereof pivotally attached to one each of said side bars and the opposite end thereof pivotally attached to the lower rear portion of said seat structure, and manually releasable lock means interengaging between said links and said side bars effective automatically to lock said mounting means in erected position.

12. A stroller as claimed in claim 11 in which said lock means includes means for selectively determining the height of the erected position of said seat structure in the erected position thereof.

13. A stroller as claimed in claim 11 in which each of said locking means includes a vertical plate fixed to the associated side bar and a horizontal, spring biased bolt carried by said plate, and a socket carried by the associated link and positioned for engagement by said bolt when said link is moved to seat erecting position.

14. A stroller as claimed in claim 13 in which each of said locking means includes other manually operable means for varying the position of said socket with resultant selective determination of the elevation at which said seat structure will be locked in erected position.

15. In a stroller type vehicle, a frame structure comprising a pair of horizontal side bars formed of rectangular metal tubing and each of said side bars having a horizontal, transverse slot at each end thereof and means rigidly interconnecting said side bars in spaced parallel relation longitudinally of the stroller comprising an oval ring of metal tubing having portions thereof secured in said slots, a seat structure disposed above said frame structure, means mounting said seat structure on said frame structure including devices operable to move said seat structure from a folded position resting on said frame structure to an erected position thereon and manually releasable means for locking said seat structure in said erected position.

16. A stroller as claimed in claim 15 in which said side bars each carry a front caster and a rear caster.

17. A stroller as claimed in claim 15 in which said locking means includes devices operable to predetermine the erected position of said seat structure.

18. A stroller as claimed in claim 15 in which the portion of said ring extending between the rear ends of said side bars carries curb engaging roller means operable to facilitate the movement of the stroller up and down a curb.

19. A stroller as claimed in claim 15 in which the portions of said oval ring extending between the opposite ends of each of said side bars are spaced outwardly from said side bars.

20. A stroller as claimed in claim 15 including a footrest and means for detachably mounting said footrest on said side bars either forwardly of said seat structure or in rear thereof.

21. A stroller as claimed in claim 15 including a footrest detachably carried by said side bars and in which said footrest includes elevating means for raising the surface thereof substantially to the plane of said seat.

References Cited in the file of this patent

UNITED STATES PATENTS

| | | |
|---|---|---|
| 123,707 | Kind | Feb. 13, 1872 |
| 189,897 | Mey | Apr. 24, 1877 |
| 2,179,275 | Sacheroff | Nov. 7, 1939 |
| 2,728,580 | Preisler et al. | Dec. 27, 1955 |
| 2,798,730 | Smith | July 9, 1957 |
| 2,880,011 | Peterson | Mar. 31, 1959 |
| 2,982,562 | Gladstein | May 2, 1961 |